United States Patent [19]
Aaberg

[11] Patent Number: 5,655,484
[45] Date of Patent: Aug. 12, 1997

[54] CALF HANDLING APPARATUS

[76] Inventor: Curtis H. Aaberg, Box 122, Fortuna, N. Dak. 58844

[21] Appl. No.: 573,718

[22] Filed: Dec. 18, 1995

Related U.S. Application Data

[63] Continuation of Ser. No. 276,985, Jul. 18, 1994, abandoned

[51] Int. Cl.$^6$ .............................. A01K 29/00; A61D 3/00
[52] U.S. Cl. ............................................ 119/735; 119/751
[58] Field of Search ................................ 119/723, 729, 119/735, 736, 751, 847

[56] References Cited

U.S. PATENT DOCUMENTS

| 1,340,357 | 5/1920 | Adix et al. ........................... 119/751 |
| 2,593,559 | 4/1952 | Heldenbrand ...................... 119/736 X |
| 2,713,326 | 7/1955 | Stephenson ........................ 119/723 |

FOREIGN PATENT DOCUMENTS

| 246133 | 5/1963 | Australia ............................. 119/735 |
| 2665054 | 1/1992 | France ................................ 119/723 |
| 2020952 | 11/1979 | United Kingdom ................ 119/751 |

*Primary Examiner*—Robert P. Swiatek
*Attorney, Agent, or Firm*—Robert E. Kleve

[57] ABSTRACT

Handling apparatus having a rectangular compartment for carrying and enclosing a calf. A support rod is fixed to the bottom of the compartment and extends forward for insertion is a sleeve attached to a pick up truck for carrying the compartment at the rear of the pick up truck spaced above the ground. The compartment has an opening along one side with a pivotally mounted ramp mounted in the opening, which may be pivoted downward to the ground to serve as a loading ramp for loading the calf into the compartment. The compartment has a head gate at its other end for holding the head of the calf while in the compartment for tagging the calf. The compartment has an opening along its rear side with a screen door pivotally mounted along the opening for viewing the calf while in the compartment. The compartment has a cover with a heater in the cover for heating the compartment. The compartment has a scale mounted in the bottom with a floor panel mounted to the scale and movable with the scale to react to the weight of the calf standing on the floor for weighing the calf.

3 Claims, 1 Drawing Sheet

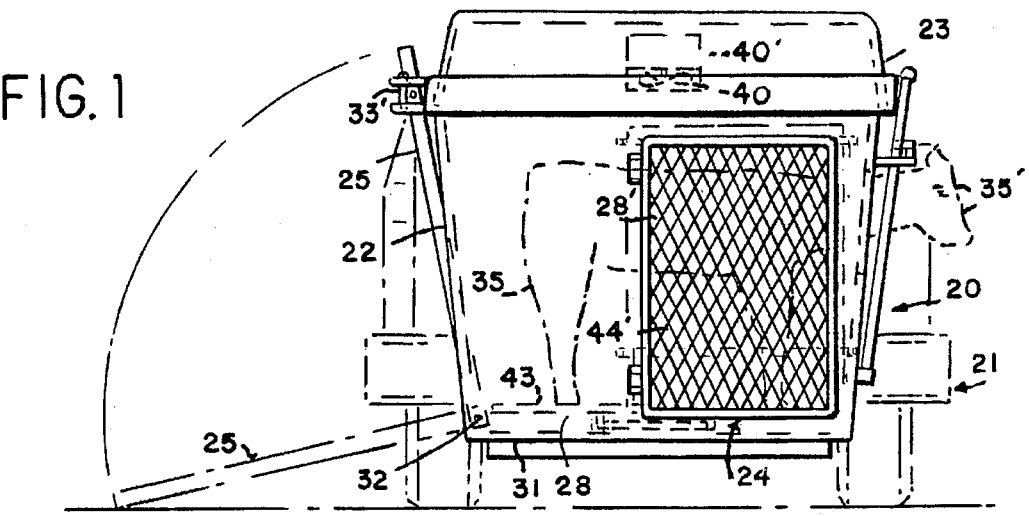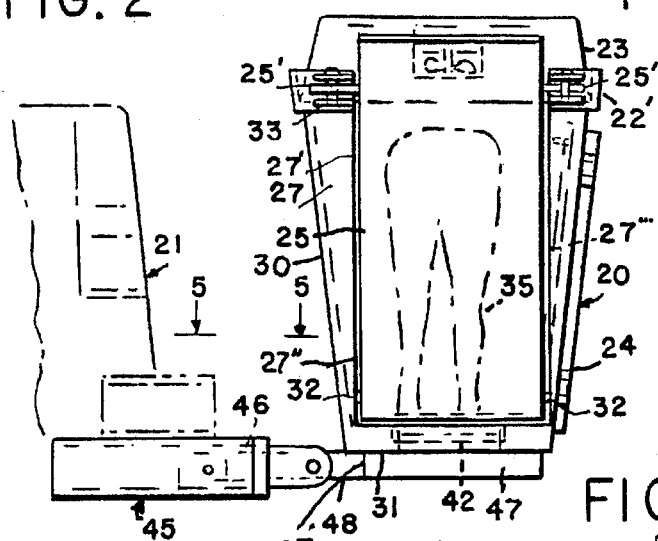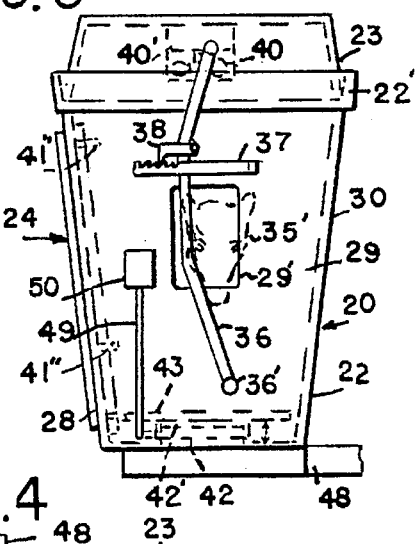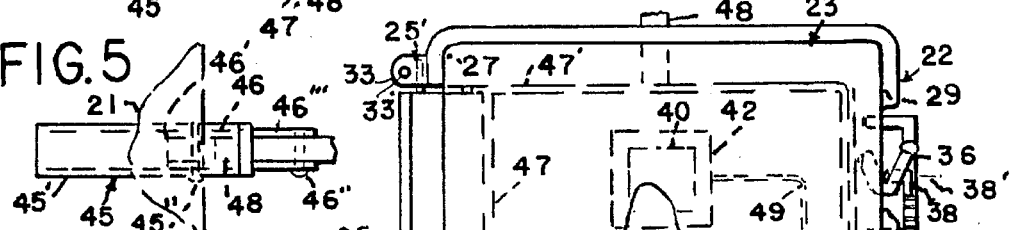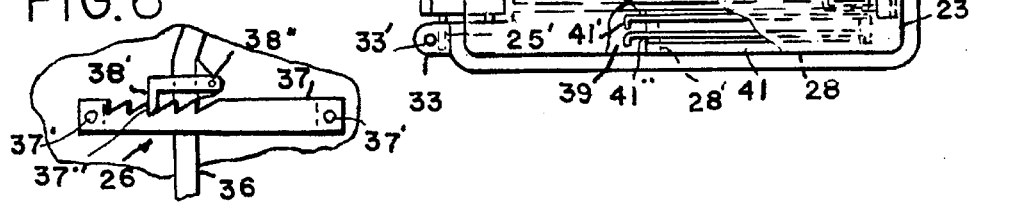

CALF HANDLING APPARATUS

This application is a continuation of Ser. No. 08/276,985, filed Jul. 18, 1994 and now abandoned.

The invention relates to calf handling apparatus.

It is an object of the invention to provide a novel calf carrying compartment for carrying and enclosing calf at the rear of the pick up truck to carry the calf from place to place.

It is a further object of the invention to provide a novel calf shelter for sheltering and enclosing a calf at the rear of a vehicle while the shelter is attached to the vehicle for moving the shelter and calf to another location.

It is another object of the invention to provide a novel shelter for mounting to the rear of a vehicle having loading mechanism and a head gate mechanism for holding the head of the calf for tagging.

It is a further object of the invention to provide a novel container for holding a calf, which container may be towed at the rear of a vehicle.

It is another object of the invention to provide a novel calf handling apparatus for handling a calf.

Further objects and advantages of the invention will become apparent as the description proceeds and when taken in conjunction with the accompanying drawings wherein.

BRIEF DESCRIPTION OF THE DRAWINGS

FIG. 1 is a rear elevational view of the calf shelter or compartment shown attached to the rear of a pick up truck, with a loading ramp shown pivoted up against the compartment for storage in solid lines and shown pivoted down against the ground for loading the calf into the compartment in dashed lines.

FIG. 2 is a left side elevational view of the calf handling or shelter apparatus, showing the loading ramp.

FIG. 3 is a a right side elevational view of the calf shelter showing the head gate mechanism.

FIG. 4 is a top plan view of the calf handling or shelter device.

FIG. 5 is a cross sectional taken along line 5—5 of FIG. 2, illustrating the attachment sleeve mechanism for attaching the calf shelter to the rear of the pick up truck.

FIG. 6 is an enlarged fragmentary view of the head gate mechanism similar to the view of FIG. 3.

BRIEF DESCRIPTION OF PREFERRED EMBODIMENT

Briefly stated, the invention comprises a calf handing compartment for hauling and holding a calf in a shelter at the rear of a pick up truck. The calf compartment or shelter has a bottom shell with four sides and a bottom and an opening along one side for a pivotal ramp to pivot downward therefrom for loading a calf into the compartment. The compartment has an opening at its other end with a head gate for holding the head of the calf outside the compartment for tagging while the body of the calf is inside the compartment. The compartment has an opening along its rear side with a screen door covering the opening for viewing and access to the calf. The compartment has a roof with a heater mounted in the roof for heating the compartment and a scale is mounted in the bottom of the compartment with a floor mounted on the scale and movable with the scale weighing mechanism downward in response to the weight of a calf thereon for weighing the calf.

Referring more particularly to the drawing, in FIG. 1, the calf handling or shelter device 20 is illustrated from a rear elevational view shown attached to the rear of a pick up truck 21. The device 20 has a bottom shell 22, with a cover 23 mounted in an outward extending annular ridge extending about the open top in the shell and resting in the annular ridge of the shell. Conventional latch means, not shown, secure the cover 23 to the shell 21. A door 24, a ramp 25, and a head gate mechanism 26 are mounted in openings 27', 28', and 29' in the three side panels 27,28, and 29 of the bottom shell 22 at the left, rear and right sides of the the shell. The shell has a fourth side 30, and a bottom panel 31 with the four sides 27–30, inclusive and the bottom panel 31 being formed integrally with one another in a plastic shell.

The opening 27' in the left side of the compartment or shell forms a slot open at the top, with the ramp pivotally mounted to the side panel 27 on each side of the slot at the bottom by pins 32. The ramp 25 has a pair of pins 25' projecting laterally outward from the top of the ramp and fixed thereto. Then side panel 27 has a dual pair of upper and lower projecting flanges 33 fixed to the panel 27 and projecting outward with vertical aligning bores in the flanges and a pair of pins 33' projecting downward through the bores to hold the pins 25' between the flanges 32 and thereby detachably hold the ramp in a upward stored position between the side edges 27" and 27''' of the panel forming the opening 27', when storing the ramp pivoted upward when not in use, as shown in solid lines in FIG. 1.

To use the ramp for loading a calf 35 into the compartment 20 as shown in FIG. 1, the pins 33' will be removed from the bores of the flanges 33 to allow the ramp to pivot downward about pins 32 to its position shown in dashed lines in FIG. 1.

The head gate mechanism 26 on the right side panel 29 of the compartment has a pivotally mounted metal rod 36, which is pivotally mounted at its bottom at pivot axis 36' to the shell and is pivotally mounted to pivot parallel to side panel 29 across the head opening 29' in the right side panel of the compartment 21. A horizontal narrow plate 37 extends horizontally across the outside of the pivoting rod 36 and is mounted to the side panel 29 in spaced relation by bolts 37' running through the ends of of the plate 37 through short cylindrical spacers into the side panel 29, with nuts threaded onto the bolts on the inside to lock the plate 37 to the panel 29, with the plate 37 serving as a guideway for the metal rod in its pivotal movement. The plate 37" has a series of notches 37' in a row along its top edge. A pivotally mounted lever 38 has its rear end 38" pivotally mounted to the rod 36 and a narrow steel short knife like end 38' pivoted downward under gravity into one of the notches 37" to prevent counterclockwise movement of the rod 36, when viewed from FIG. 3. Since the left edge or face of the notches will be engaged by the end 38' in a direction extending below the rotational axis 38" to the left, the face will prevent further movement of the lever upward and the lever being unable to pivot downward, further into the notch, thereby stopping any further movement of the lever 38 or rod 36 from moving to the left of its position, when the lever end is engaged in a particular notch 37" unless the lever 38 is lifted manually upward out of the notch, when viewed from FIGS. 3 and 6.

An electric heater 40 and fan 40' are mounted in the cover 23 and the fan 40' directs the heat from the heater downward into the bottom shell 22 of the compartment for heating the calf 35 when in the compartment.

Along the inside 39 of the rear panel 28 is a solid panel 41 which is rectangular in shape and imperforate. The inside of the panel has four lugs 41', which project outward and two rods 41" are fixed to the outer ends of the lugs in a position spaced parallel from the inside surface to provide a guideway to receive the rectangular panel so that it may be downwardly inserted between the panel and the rods from the upper edge of the panel and upwardly removed therefrom, when the cover is removed.

A scale 42 mounted in the bottom panel 31 of the shell 22. The scale has a conventional movable platform 42' which is movable downward in response to the downward application of weight thereto. A rectangular panel 43 is fixed to the movable platform 42' to move downward with the platform 42', whereby when a calf 35 stands on the panel or floor 43 the floor is free of the sides of the shell and is free to move downward under the weight of the calf, along with the scale platform, with the scale having registering means to register the amount of weight applied by the weight of the calf, to thereby weigh the calf.

The shell has a rectangular metal frame 44 with wire mesh grill 44' across the frame to form the door 24. The door 24 is pivotally mounted to the rear panel across the outside of the panel to form a screen door across the opening and is pivotally mounted to the panel 28 on hinges 24'. A suitable latch, not shown, may be provided to lock the door closed across the opening 28' as shown in FIG. 1,2 and 3.

A control panel 50 will provide a read out display of the weight registered by the scale 42 and will be connected to the scale 42 by an electric cord 49, so that the display on the panel may be read at a location remote from the scale, by the panel 50 being mounted to the panel 29 of the shell, as shown in FIGS. 1,3 and 4.

A towing mechanism 45 is provided for towing the compartment 20 behind the pick up truck 21. The pick up truck 21 will having a conventional towing sleeve 45' with a square cross section. An adapter sleeve 46 having an outer diameter slightly smaller than the inside diameter of the sleeve 45' and also having a square cross section will be inserted into the sleeve 45' and will be held in place by a pin 45" extending through bores in the sleeve 45' aligning with bores in the adapter sleeve 46. The adapter sleeve will also have a pair of side flanges 46" and 46'" fixed thereto.

The calf compartment 20 will have a four flange portions 47 fixed together in a square beneath the bottom 31 of the bottom shell and formed integally into the bottom 31 of the compartment. A square metal rod 48 will be welded to the front metal flange portion 47' and will project forward. The metal rod 48 will have an outside diameter slightly smaller than the inside diameter of the adapter sleeve 46 so as to fit therein in non rotation relation, as shown in FIGS. 2 and 5, with its forward end 46' inside the sleeve The side flanges 46" and 46'" will be positioned on each side of the rod 48 and bores in the flanges will align with a bore through the rod 48 to received a pin through the flanges and rod 48 to lock the rod 48 to the adapter sleeve 46 with the adapter sleeve 46 locked to the sleeve 45 of the pick up truck in a rigid horizontal position as shown in FIGS. 1 and 2, with the compartment suspended above the ground which the pick up truck will be traveling upon.

As an alternative form of towing the calf compartment 20, a pair of wheels may be rotatably mounted beneath the compartment (not shown), so that the compartment may roll on the wheels along the ground, with the towing rod attached to a suitable towing vehicle.

The calf compartment device 20 may be operated by attaching the compartment device to the rear of a pick up truck. The cover 23 may be removed temporarily, so that the sliding panel 41 may be slid upward along the inside 39 of the panel 28 out of the rods 41" and removed so that when the calf is loaded into the compartment, the calf's mother will be able to view the calf through the screen mesh or grill 44' which tends to pacify the calf's mother. She will be able to see the calf, once the calf is loaded into the compartment by unlatching the ramp and having the calf walk up the ramp into the compartment and then swinging the ramp back up and re-latching it, by viewing, the calf through the screen door. The operator, once the calf is loaded into the compartment, may place the calf's head out the opening 29' and may hold the calf's head in this position by using the head gate mechanism 26 latched against the calf's head so that it will not move or fight the operator as much when tagging or administering medicine to the calf while in the compartment, and so the calf may not withdraw its head to the inside of the compartment.

The compartment may be used to transport the calf to different locations and the calf's mother may see the calf through the screen door and follow along with the pick up truck, compartment and calf.

The pins 33' may be removed to allow the ramp to swing down to the ground for loading the calf into the compartment, before transporting it; and for unloading the calf from the compartment once the transporting of the calf is complete.

It will be obvious that various changes and departures may be made to the invention without departing from the spirit and sconce thereof; and accordingly, it is not intended that the invention be limited to that specifically described in the specification or as illustrated in the drawing but only as set forth in the appended claims wherein we claim:

1. A calf shelter apparatus comprising a compartment, means for mounting said compartment to the rear of a vehicle for traveling on the ground with the compartment suspended above the ground, said compartment having a plurality of sides connected together to form a compartment and having a top and bottom, one of said sides having an opening, a ramp pivotally mounted in said opening whereby said ramp may be pivoted downward to the ground for leading a calf into the compartment, a second of said sides having a second opening for receiving the head of a calf while the body of the calf is in the compartment, head gate means for holding the head of the calf in said second opening outside the compartment for tagging the calf, said compartment having a rear one of said sides with an opening in said rear side, a screen door pivotally mounted to open and close said rear opening.

2. A calf compartment device for hauling and carrying a calf comprising a compartment, a vehicle for traveling on the ground, said vehicle having compartment attaching means for attaching said compartment to said vehicle, said compartment having four side walls and a bottom panel with said compartment when attached to said vehicle having said bottom spaced above the ground, said compartment having a cover and forming an enclosure for a calf, and having an opening in one of said walls extending to the bottom panel, a ramp movably mounted in said opening for movement downward whereby one end of the ramp is adjacent the bottom panel at the bottom of the opening in the compartment and the ramp extends at an angle away from from the compartment toward the ground with its other end adjacent the ground to enable the calf to walk up the ramp into the compartment, said compartment having an opening in a second of said walls opposite said one wall for receiving the head of the calf with a gate mechanism for holding said head extending through said opening, said compartment having an opening along a rear one of said walls with a door in said rear opening and movable to open and close said rear opening, said door having means to view the calf through the door.

3. A calf compartment device for hauling and holding a calf comprising a compartment having towing means for towing and supporting the compartment suspended at the rear of a vehicle, said compartment having four walls forming an enclosure and a bottom and a cover over the top of the compartment, said compartment having an opening in one of said walls, a ramp pivotally mounted in said opening for pivoting downward to the ground beneath the vehicle to load a calf into the compartment, said compartment having an opening in a second of said walls opposite said one wall for receiving the head of a calf with gate mechanism for holding said head extended through said opening, said compartment having an opening along the rear one of said walls with a screen door pivotally mounted to open and close said opening, a heater mounted beneath said cover to head said compartment, a scale mounted to the bottom of said compartment, and a movable floor mounted to the scale to move in response to the weight of the calf standing on the floor in the compartment whereby the scale in response to the floor movement will register the weight of the calf.

* * * * *